July 25, 1967

E. C. FORCIER 3,333,274

TESTING DEVICE

Filed April 21, 1965

Fig_1

INVENTOR.
EDWARD C. FORCIER
BY
ATTORNEY

July 25, 1967  E. C. FORCIER  3,333,274
TESTING DEVICE

Filed April 21, 1965  3 Sheets-Sheet 3

INVENTOR.
EDWARD C. FORCIER
BY
ATTORNEY

United States Patent Office 3,333,274
Patented July 25, 1967

3,333,274
TESTING DEVICE
Edward C. Forcier, Los Gatos, Calif., assignor to Micro Tech Mfg., Inc., Sunnyvale, Calif., a corporation of California
Filed Apr. 21, 1965, Ser. No. 449,792
10 Claims. (Cl. 346—33)

ABSTRACT OF THE DISCLOSURE

Apparatus for probing a semiconductor wafer is provided with a marking surface remote from the probing head. The marking surface receives an impression in response to a test signal from the probing head. A pattern is formed on the marking surface which is an image of the location of selected dice on the semiconductor wafer. The marking surface is then used in association with the probed wafer for subsequent steps in the processing of semiconductor devices from the wafer.

---

This invention relates generally to a testing device used in the testing or probing of a plurality of identically formed transistors or integrated circuits, usually referred to as dice, disposed in rowed columns on a semi-conductor crystal wafer, and in particular to improved means for recording the position of and marking selected dice.

The testing of previously processed transistors or integrated circuits, formed on a semi-conductor wafer, is called probing. Each of the transistors or integrated circuits, known as dice, normally has one or more selected probing areas or contact points, and the process of probing comprises the steps of contacting selected probing areas of each die, in succession, with a probe means which is electrically connected to a parameter test station and makes an electrical parameter check. This tells the dice manufacturer whether a die meets certain selected specifications, is shorted, opened, etc. In this manner the position of those dice not suitable for a given purpose may be determined and suitably marked so as to assist in later classification.

Devices used for probing normally include a means for holding the wafer for test, probe means for making contact with the probe areas of the individual dice and electrically connected to a parameter test station, a means for moving the wafer relative to the probe, means for aligning the probe means with the probing areas of the individual dice, a means for bringing the probe means into contact with the probe areas for accomplishing the test, and some means for marking defective dice in response to a test signal so as to assist in later classification.

The method most commonly used in industry today for marking dice employs a marking means including a pen so positioned as to contact a die when it is found to be defective. There are certain drawbacks in this type of arrangement, principally due to the difficulty of assuring a proper flow of ink from the pen that leaves a clean unsmeared mark consistently and without splattering ink on adjacent dice, and in fabricating a pen capable of marking such small dice, some of which are less than 0.0125 inch square. Further, these arrangements require special types of inks and eliminate many otherwise suitable inks, namely, those which do not flow or which are quick drying. Other methods, less widely used, physically destroy those dice found to be defective with electric spark, scribing, sandblasting and the like. However, such methods are not suitable for all situations. For example, a die found to be defective for one application, though not shorted or opened, may be acceptable, if not destroyed, in some other application.

The instant invention overcomes the above-mentioned prior art difficulties by the provision of a marking means for recording the position of a defective die which includes an impression receiving surface, for example, a card holder movable with the wafer moving means and adapted to receive a card, and an impression forming means, for example, a means for punching holes in the card in response to test signals received from the parameter test station. Initially, the wafer holding means is aligned with respect to the probe means and the punch is aligned with respect to the card holder. The wafer is then probed in the usual manner. When a defective die is found, a test signal is generated at the parameter test station, in response to which the punch is either automatically or manually actuated to form a small hole in the card. When the entire wafer has been probed, a pattern is formed on the card which is an image of the location of the defective dice on the wafer. The card may then be placed over the wafer on alignment points on the wafer holding means and ink transferred therethrough by means of an air brush or roller or brush, for example, to mark all the defective dice on the wafer. In addition, the card is a permanent record of the die failure rate and particularly of the wafer position of the defective die.

Accordingly, it is the principal object of the present invention to provide a probing device having improved marking means.

One feature of the present invention is the provision of a probing device which includes a marking means for recording the position of a defective die on the wafer including an impression receiving surface, preferably a card holder for receiving a card connected for movement with the wafer moving means and an impression forming means, preferably a means for punching holes in the card in response to test signals received from the parameter test station.

Another feature of the present invention is the provision of a marking means of the above type of first means for positioning the card on the card holder, second means for positioning the card on the wafer holding means over the wafer, the first and second positioning means being aligned with each other, and means for aligning the punch with respect to the card.

Still another feature of the present invention is the provision of a probing device of the above type wherein the wafer holding means includes a frame member secured to the wafer moving means and the card holder is integral with the frame member.

A further feature of the present invention is the provision in a probing device of the above type of a wafer mount slidably held within the frame member, the second positioning means being located on the slidable mount.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

Figure 1:
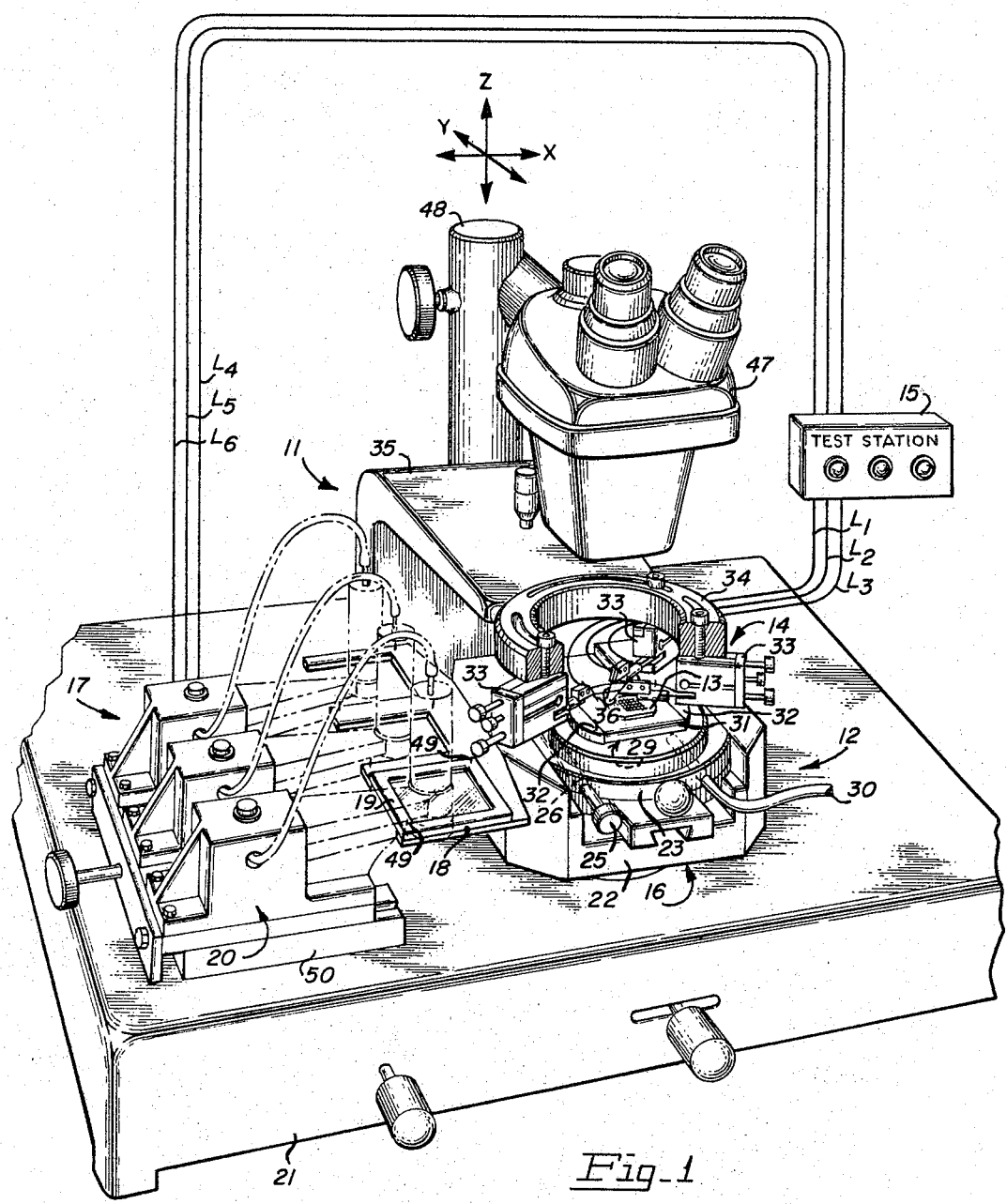
FIG. 1 is a perspective view partially cutaway and partially in phantom of a preferred embodiment of the present invention, showing a parameter test station in schematic.
Figure 2:
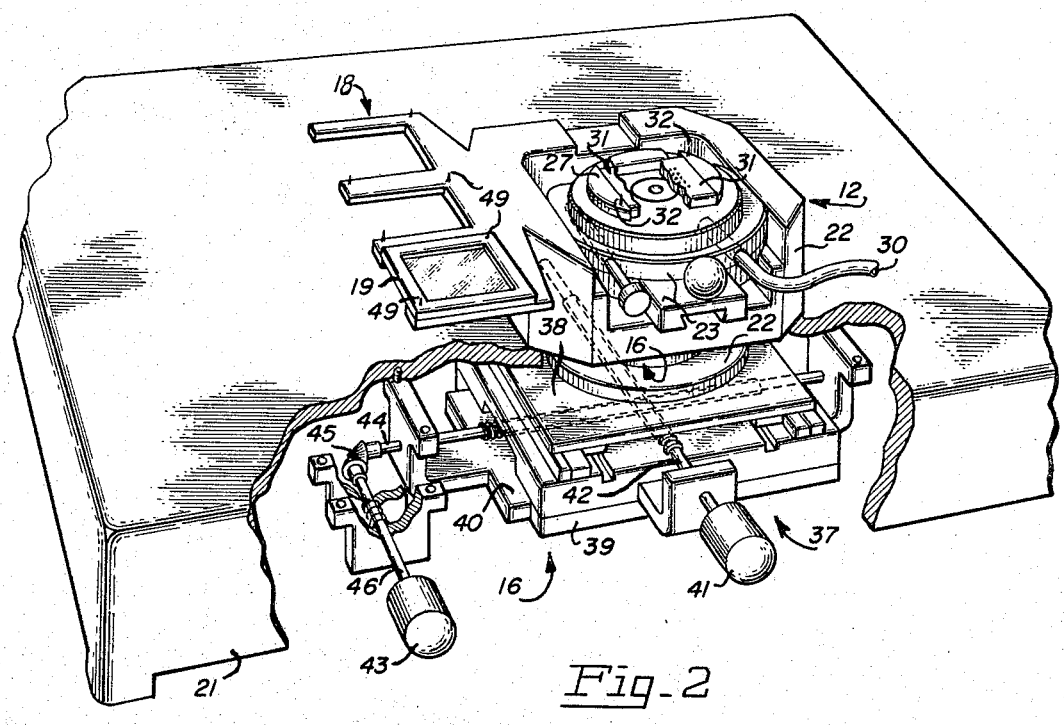
FIG. 2 is an enlarged fragmentary view of a portion of the device of FIG. 1.
Figure 3:
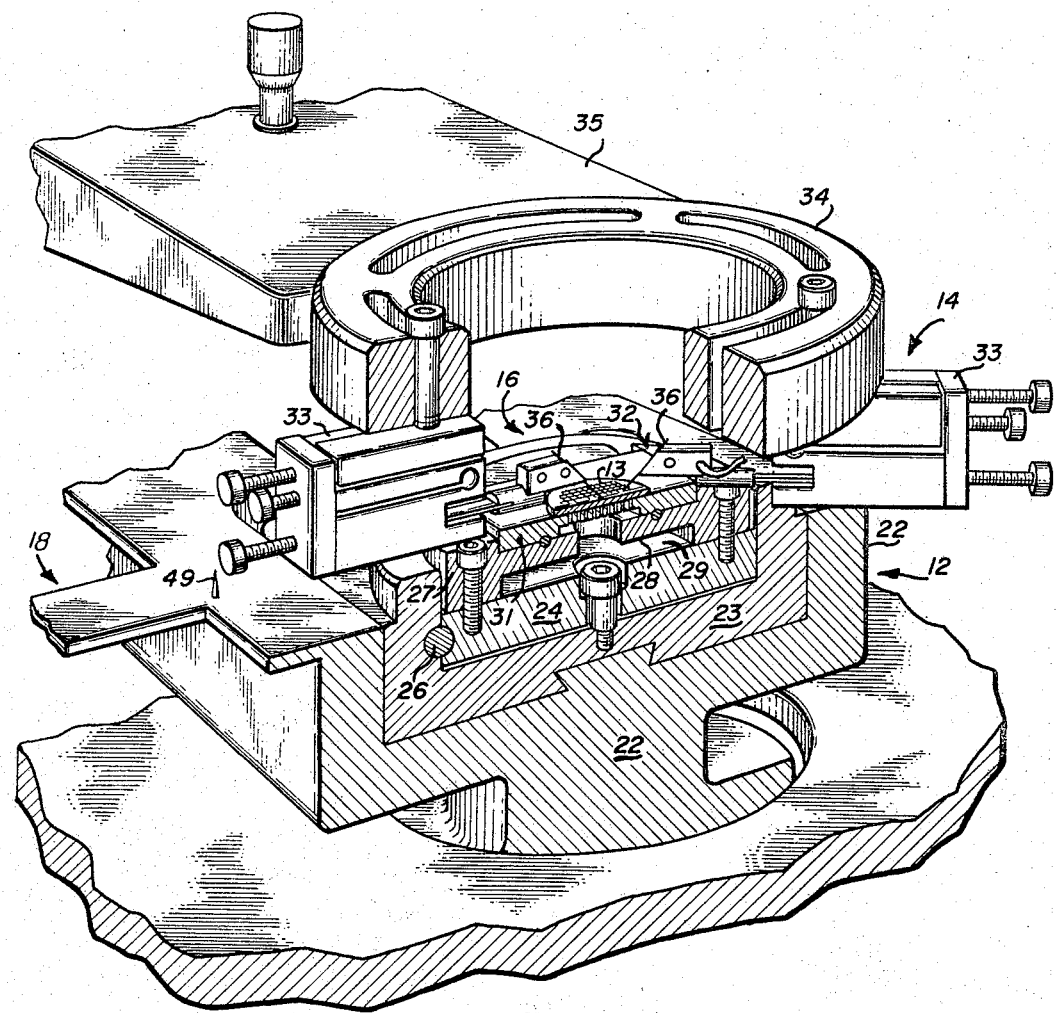
FIG. 3 is an enlarged fragmentary view of a portion of the device of FIG. 1.

Referring now to FIGS. 1–3, there is disclosed the novel probing device 11 constructed in accordance with the teachings of the present invention comprising: A means 12 for holding a wafer 13 for test; probe means 14 for making contact with the probe areas of an individual die and upon contact permit a test signal to be generated at a parameter test station 15; means 16 for moving the wafer 13 relative to the probe means 14 for successively aligning the probing areas of individual dice with probe means 14; and, a marking means 17 for recording the position of a defective die on the wafer 13 including a card holder 18 for receiving a card 19 secured to the wafer moving means 16, and a means 20 for punching holes in the card 19 in response to signals received from the parameter test station 15. The entire device 11 may be mounted on and within a base casting 21.

The means 12 for holding the wafer 13 for test may include: A frame member 22; a wafer mount 23 slidably mounted within frame member 22; a base plate 24 secured to but rotatable within wafer mount 23 upon turning the knob 25 to a worm gear 26 which gear is operatively positioned between plate 24 and mount 23; a collector plate locator 27 secured to plate 24 having a downwardly offset, apertured central portion 28 spaced from and forming with plate 24 a chamber 29 adapted to be partially evacuated through tubulation means 30 by means of a suction pump (not shown); and, multiple apertured collector plate 31 held on the central portion 28 of locator 27 for holding wafer 13. Additionally, a pair of diagonally positioned alignment pins 32 extend upwardly from the wafer mount 23 for positioning the card 19 over the wafer 13. In use, a wafer 13 to be probed is placed by an operator on the collector plate 31 which plate is then positioned on the locator 27. The wafer 13 is held in place by vacuum. Prior to probing, the wafer 13 may be rotated by turning knob 25 so as to aid in initial alignment with the probe means 14. Upon completion of probing the wafer mount 23 may be slid out from under the probe means 14 and card 19 placed on the pins 32 over the wafer 13.

The probe means 14 may comprise one or more probe heads 33 (depending upon the number of probe areas per die) radially adjustably secured to a mounting ring 34 which in turn is integral with a pivotally mounted support member 35. Each probe head is provided with a probe point 36, the position of which is individually adjustable over $1/16$ of an inch in the X, Y and Z plane. Once adjusted to a single die, the position of the probe head points 36 need not be readjusted during the probing of a wafer, since the location of the probing areas is essentially identical from die to die over the entire surface of the wafer. Adjustment is linear with sufficient reduction to make adjustment as small as 0.0001 inch in any plane and once set will not wander.

The probe points 36 are adapted for contact with the probe areas of each individual die successively. For example, the member 35 may be pivotally actuated to bring the points 36 into contact with the probe areas by means of a motor and cam (not shown) located in base casting 21. This would assure that all dies are tested with the same contact pressure. The probe heads 33 are electrically connected by leads $L_1$, $L_2$ and $L_3$ to a test station 15 so that upon contact by the points 36, a test signal may be generated at station 15 to indicate whether the paricular die being probed is shorted, opened, below specifications, or above specifications. Test station 15 may be adjusted to generate no signal when the tested die just meets a selected specification.

A means 16, for moving the wafer 13 relative to the probe means 14, is provided so as to successively align the contact points 36 with the probe areas of each individual die. The means 16 may include a mechanical stage 37 having a Y platform 38 to which frame member 22 is secured, slidably held on an X cradle 39, which in turn is slidably held within a stationary mount 40. The wafer holding means 12 may be manually actuated in the Y direction upon rotation of knob 41 through the intermediary of a rod 42 threadedly engaged to the platform 38. Rotation of knob 41 causes movement of the platform 38 along the rod 42 which in turn is secured to frame member 22 of holding means 12. The holding means 12 is actuated in the X direction upon rotation of knob 43 through the intermediary of a rod 44 threadedly engaged to cradle 39, gearing 45 and linkage 46. Rotation of knob 43 causes movement of cradle 39, platform 38 and the frame member 22 of the means 12. Additionally, a microscope 47 held on a support rod 48 secured to member 35 permits an operator to view the individual die during alignment.

The novel marking means 17 illustrated includes, one or more card holders 18, cards 19 and punching means 20. The position of the card holder is not critical nor is its structure so long as it moves with the means 16 and has some means for aligning the card 19 with the holding means 12. It is illustrated as being integral with the frame member 22 and having a pair of pins 49 aligned with the pins 32 on the holding means 12. The card 19 may simply be a sheet of film held in a diagonally apertured cardboard frame.

The type of punch 20, illustrated as of the pneumatic variety, is not critical and the size of the hole punched in the card 19 may be varied by varying the size of the punch die. The size of the punch die used will normally be dictated by the size of the individual semi-conductor die. Punch 20 is adjustably positioned on a platform 50.

Orientation of the punch 20 is accomplished by the use of a "standard" card. The standard card is placed on the wafer holding means 12 and the probe means 14 set to the card using the moving means 16. Then the same card is placed on the card holder 19 and the punch 20 aligned to the card.

Actuation of the punch 20 may be manual or automatic. In response to a signal from the test station 15, an operator may manually depress the punch 20. Alternatively, the punch may be electrically connected by leads $L_4$, $L_5$ and $L_6$ to test station 15 whereby in response to a test signal, one or more punches 20 may be automatically depressed.

The wafer is probed in the usual manner, the operator moving the wafer 13 relative to the probe means 14 step by step by successive positioning of the wafer moving means 16. When a defective die is found, a test signal is generated at the parameter test station in response to which the punch 20 is either automatically or manually actuated to form a small hole in the card 19. When the entire wafer has been probed, a pattern is formed on the card which is an image of the location of the defective dice on the wafer. The card may then be placed over the wafer 13 on the alignment pins on the wafer holding means 12 and ink transferred therethrough. In addition, card 19 is a permanent record of the die failure rate.

The device has the following advantages: Any ink may be used including magnetic ink for automatically sorting after dicing. Masking is many times faster and will not damage the wafer. The card is a permanent record of the device failure rate. This information can be utilized for long range studies of failure areas and process control checks, as well as furnishing a record to be sent to customers that buy whole, undiced wafers.

Even though the above description of this device refers to the marking of defective dice, it is to be understood that the invention may advantageously be utilized in sorting the various dice according to their qualities. When means 20 comprises but a single punching station, it is usually actuated when a die is either defective or below specifications. However, when means 20 includes several punching stations, grading of the individual dice may be accomplished. For example, each punching station may have a somewhat different punch, say round and cruciform. When a particularly high quality die is probed, two signals are generated. Later, when marking the wafer, the round punched holes are painted first and thereafter the cruciform punched hole is painted second, in a different color, to indicate the high quality die.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A probing device used for successively probing a plurality of dice formed on a semi-conductor crystal wafer, each die having one or more selected probing areas, comprising:
   a means for holding the wafer for test;
   probe means for making contact with the probe areas of an individual die and upon contact generate a test signal commensurate with a condition of the contacted die;
   a means for moving the wafer relative to said probe means for successively aligning the probing areas of individual dice with said probe means; and
   a marking means for recording the position of a defective die on the wafer including a separate impression receiving surface spaced from the wafer and connected for movement with said wafer moving means, and an impression forming means for forming impressions on said surface in response to said test signal.

2. In a probing device used for successively probing a plurality of dice formed on a semi-conductor crystal wafer, each die having one or more selected probing areas, and which includes a wafer holding means, a probe means for contacting the probe areas of an individual die and upon contact generate a test signal commensurate with a parameter of the contacted die, wafer moving means for successively aligining the probing areas of individual dice with the probe means, the improvement which comprises:
   a separate impression receiving surface spaced from the wafer and connected for movement with said wafer moving means, and;
   an impression forming means for forming impressions on said surface in response to said test signals.

3. A probing device used for successively probing a plurality of dice formed upon a semi-conductor crystal wafer, each die having one or more selected probing areas, comprising:
   a means for holding the wafer for test;
   probe means for making contact with the probe areas of an individual die and, upon contact, generate a test signal indicative of the condition of a selected parameter;
   a means for moving the wafer relative to said probe means for successively aligning the probing areas of individual dice with said probe means; and
   a marking means for recording the position of a die, having a predetermined condition of said selected parameter, said marking means including a card holder connected for movement with said wafer moving means and for receiving a card, and a means for punching perforations in the card in response to said test signals.

4. The device according to claim 3 including first means for positioning the card on said card holder, second means for positioning said card on said wafer holding means over said wafer, said first and second positioning means being aligned with each other, and a means for aligning said punch with respect to said card.

5. The device according to claim 3 wherein said wafer holding means includes a frame member secured to said wafer moving means and said card holder is integral with said frame member.

6. The device according to claim 4 wherein said wafer holding means includes a wafer mount slidably held within said frame member, said second positioning means being positioned on said slidable mount.

7. A probing device used for successively probing a plurality of dice formed on a semi-conductor crystal wafer, each die having one or more selected probing areas comprising:
   a means for holding the wafer for test;
   probe means for making contact with the probe areas of an individual die;
   a parameter test station electrically connected to said probe means for generating test signals upon contact of said probe means with said probe areas;
   a means for moving the wafer relative to said probe means for successively aligning the probing areas of individual dice with said probe means; and
   a masking means for recording the position of certain of said dice on the wafer, said masking device, including a card holder connected for movement with said wafer moving means and for receiving a card, and a means electrically connected to said parameter test station for perforating the card in response to test signals generated at said parameter test station.

8. The device according to claim 7 including first means for positioning the card on said card holder, second means for positioning said card on said wafer holding means over said wafer, said first and second positioning means being aligned with each other, and a means for aligning said punch with respect to said card.

9. The device according to claim 7 wherein said wafer holding means includes a frame member secured to said wafer moving means and said card holder is integral with said frame member.

10. The device according to claim 8 wherein said wafer holding means includes a wafer mount slidably held within said frame member, said second positioning means being positioned on said slidable mount.

References Cited

UNITED STATES PATENTS

| | | | |
|---|---|---|---|
| 2,535,353 | 12/1950 | Drake et al. | 346—33 |
| 3,185,927 | 5/1965 | Margulis et al. | 324—158 |
| 3,213,677 | 10/1965 | Maklary | 346—33 |
| 3,264,556 | 8/1966 | Krantz | 324—158 |

RICHARD B. WILKINSON, *Primary Examiner.*

MICHAEL L. LORCH, *Assistant Examiner.*